United States Patent [19]

Strommer

[11] Patent Number: 4,988,747

[45] Date of Patent: Jan. 29, 1991

[54] PROCESS FOR PREPARING A BITUMINOUS BINDER MODIFIED WITH PLASTICS FOR BUILDING MATERIALS

[75] Inventor: Erich Strommer, Schattendorf, Austria

[73] Assignee: Novophalt Overseas S.A., Luxembourg

[21] Appl. No.: 215,038

[22] Filed: Jul. 5, 1988

[51] Int. Cl.$^5$ .......................... C08J 3/20; C08L 95/00
[52] U.S. Cl. ...................... 524/59; 523/323; 523/346; 523/351; 524/68; 524/69; 524/70; 524/71
[58] Field of Search ............... 523/324, 323, 346, 351; 524/59, 68, 69, 70, 71; 525/54.1, 53

[56] References Cited

U.S. PATENT DOCUMENTS 4,314,921 2/1982 Beigenzein .................. 523/324
4,567,222 1/1986 Hagenbach et al. .............. 525/54.5

FOREIGN PATENT DOCUMENTS 3202480 8/1983 Fed. Rep. of Germany ..... 525/54.5

*Primary Examiner*—Allan M. Lieberman
*Attorney, Agent, or Firm*—Leydig, Voit & Mayer

[57] ABSTRACT

Process for the production of a binder modified with synthetic material for building materials, especially street-building material, in which for the formation of the binder, molten bitumen together with a thermoplast or a thermoplast mixture, preferably an olefin polymer, is subjected to a homogenization treatment. To the mixture containing the bitumen and a thermoplast or a thermoplast mixture, there is supplied in the form of kinetic energy an amount of energy corresponding to the difference between the treatment temperature and the disintegration temperature of the thermoplast or thermoplast mixture to form readily reacting molecular fragments of the thermoplast or thermoplast mixture. Preferably, the mixture containing bitumen and the thermoplast or a thermoplast mixture is driven through a narrow gap between two mixing tools standing opposite to one another and rotating relatively to one another.

37 Claims, 2 Drawing Sheets

PROCESS FOR PREPARING A BITUMINOUS BINDER MODIFIED WITH PLASTICS FOR BUILDING MATERIALS

FIELD OF THE INVENTION

The present invention relates to a process for the production of a bituminous binder modified with synthetic material for use as a construction material, especially a street building material, in which fusible bitumen, together with a thermoplast or a thermoplast mixture, preferably an olefin polymer, is subjected to a homogenization treatment during the production of the binder.

BACKGROUND OF THE INVENTION

A number of processes for the production of bituminous binders of the aforementioned type are known by which an improvement in properties is accomplished when ordinary bitumen is combined with addition of a thermoplast or thermoplastic material. Such modifying of the bitumen often requires a re great labor expenditure because a number of different thermoplasts, whose addition to bitumen is capable of improving its properties considerably, are not readily soluble in bitumen. Although there does exist thermoplast materials suitable for the modification of bitumens which have better solution properties in bitumens, these thermoplasts often have a relatively high acquisition price. Moreover, construction materials produced with such soluble thermoplasts often have lower physical strength than those construction materials whose binder is a bitumen treated with the relatively non-soluble thermoplasts.

BRIEF SUMMARY OF THE INVENTION

It is an object of the present invention to provide a process of the type mentioned above using the relatively non-soluble thermoplasts or thermoplastic materials, e.g., polyethylene, which makes it possible to not only achieve a rapid run-off of the homogenization process, but also yields a bituminous binder which presents clearly better properties than like or similarly composed bituminous binders which have been produced with known processes.

The process of the present invention is characterized by a mixture which contains a thermoplast or a thermoplast mixture which is used to produce highly reactive molecular fragments of this thermoplast or thermoplast mixture. To accomplish this objective, there is supplied a given amount of kinetic energy corresponding to the difference between the treatment temperature and the disintegration temperature of the thermoplast or thermoplasts. The term "treatment temperature" is defined as the temperature of the mixture as macroscopically measured by conventional means. The term "disintegration temperature of the thermoplast" is defined as the temperature at which the molecules of the thermoplast disintegrate into fragments, these fragments then entering into a reaction with the bitumen, thereby forming new substances.

By this procedure, the above-mentioned goal can be met and there is thus discovered the production of binders using bitumen and modifying thermoplasts —despite the fact these thermoplasts may be, per se, relatively insoluble in bitumens—in a relatively short time. Furthermore, through this modification additional improvements in the properties of the binder may be achieved, for example, in the adhesion of the binder to rock material and in the strength of the construction materials generated with such a binder.

DETAILED DESCRIPTION OF THE INVENTION

Figure 1:
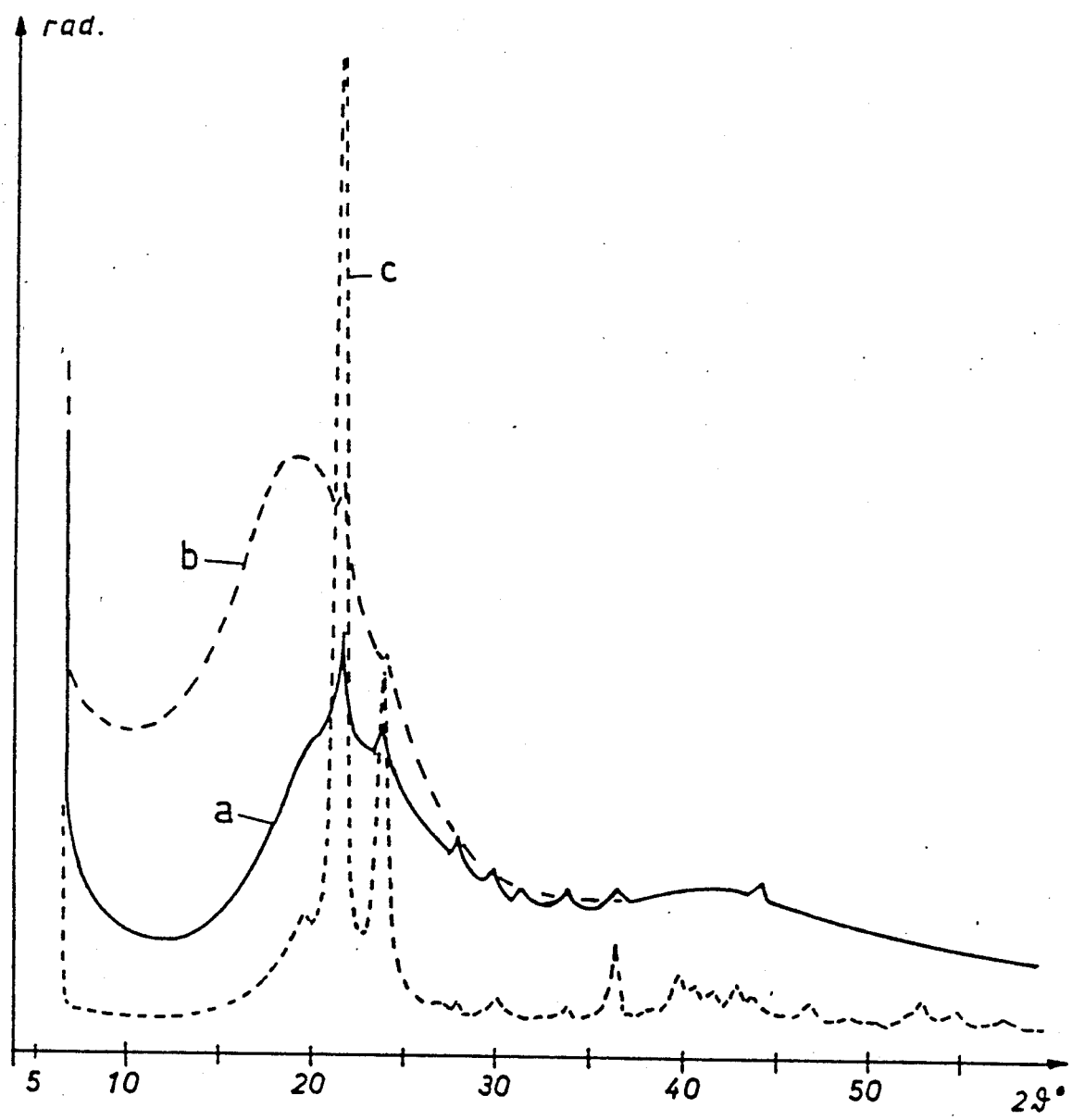
FIG. 1 is an X-ray spectra of various substances.

It is well known in the art to mix a heated bitumen-thermoplast mixture only enough so as to ensure thorough mixing. All such processes, however, have a disadvantage in that the total mechanical energy used for mixing has so far been difficult to apportion correctly, which leads to mechanically inferior products. For example, in the case of too low an energy feed, end products with poor physical properties are produced, and in the case of too high an energy feed, an unnecessary expenditure of energy or excessively severe disintegration, especially of the bitumen, may be experienced. Only by the teaching of the present invention is it possible to use the energy input into the mixing system with the least possible deterioration of the material, especially of the bitumen, while still allowing for the desired regulated decomposition of the thermoplast or thermoplasts contained in the mixture.

The preferred embodiment of the process of the invention comprises driving the mixture containing bitumen and a thermoplast or a thermoplast mixture through a narrow gap, on the average having a width less than 3 mm, and preferably a width less than 0.3 mm, existing between two mixing tools. These tools preferably stand opposite to one another and are arranged coaxially. The working of the mixture through this gap, which is preferably interrupted by pauses after each gap run-through, is continued until a clear structural change in the mixture is ascertainable, for example, by use of an X-ray spectrum.

It should be understood that the data given above regarding the width of the gap between the mixing tools are only average values. The gap can also be interrupted by recesses, such as grooves or the like. However, the greater spacing present due to the placing of such recesses or grooves on the mixing tools is not to be taken into account when determining the average gap width.

Due to the fact that the fusible mixture of bitumen and thermoplastic synthetic material is driven through a narrow gap, such as that described previously, there exists, besides the thermal influencing, a special kinetic energy stress on the mixture which affects especially the thermoplast component. Decomposition sets in under these loads due to the molecular present in the mixture having shorter molecular fragments which have a strong tendency to consolidate. The prior art methods for mixing utilize an intensively driven force, whereby a mixture, such as a mixture of bitumen and polyethylene, are subjected to a combined thermal and mechanical load. Upon completion of this mixing there is found a weakening of the spectral lines of the X-ray spectrum which relate to the characteristic of the crystal structure of the synthetic material constituent, assuming, of course, the treatment has been continued long enough at the disintegration temperature of the constituent or constituents.

In the examination of a mixture driven according to the process of the present invention, however, there appears to be clearly recognizable X-ray spectrum lines which indicate the presence of a new crystal type structure. Corresponding to this appearance of X-ray spectrum lines, which indicate this new crystal structure, construction materials that have been manufactured with a binder produced using the method of the present invention have better mechanical properties than those building materials that have been formed with binders in which bitumen and thermoplastic synthetic material have been mixed with one another by intensive agitation while in the molten state.

Moreover, there exists a further advantage of the aforementioned inventive procedure. This manner of production of the bituminous binder which has been modified with thermoplastic synthetic material may be carried out in a shorter time when compared to those methods and materials presently in use. In addition, and possibly most importantly, it is possible to work the aforementioned synthetic thermoplastic material and bitumen mixture at a lower mean temperature or treatment temperature than is possible using the known homogenizing of such a mixture by intensive agitation. It should now be recognized that this is possible due to the fact that, on the one hand, the synthetic material molecules during the driving of the mixture through the narrow gap undergo a mechanical stretching and, on the other hand, the particles of the thermoplastic synthetic material are heated substantially higher than the bitumen in a short time by the forces acting on the mixture, this being due to the thermoplastic higher molecular weight. This brief heating is sufficient to divide the molecules of the thermoplastic synthetic material into highly reactive fragments. Such fragments then combine into a partially crystalline structure. This change is evidenced upon comparing the X-ray lines with respect to the state present before the mixture is driven through the gap, and lines present after this driving occurs. The synthetic structure which is at least partly crystalline arises in the bitumen and is also closely interwoven with the bitumen.

The close interweaving of the thermoplast with the bitumen can also be perceived from the binder's relatively long-lasting hot storage capabilities A mixture of the bitumen and thermoplast treated according to the process of the invention is visually homogeneous immediately after its production, and upon illumination with light of the visible wavelength range, as well as upon illumination with ultraviolet light there exists a dense pattern of bright points on a darker background. After hot storage for many hours at a temperature that is clearly above the melting temperature of the thermoplast, the particles previously visible as points unite to form a bright cover layer whose volume is about four to five times the volume of the thermoplastic constituent of the mixture. Upon brief stirring, this cover layer can be combined again with the remaining part of the binder into a visually homogeneous substance. This behavior differs from the behavior of a homogenized product obtained using the prior art method of long stirring of a molten mixture. In such a product, after hot storage for a number of hours, a bright cover layer is found whose volume corresponds approximately to the volume of the thermoplastic constituent of the mixture, and for the rehomogenizing of the cover layer with the main part of the material from which the cover layer has separated, virtually the same agitating work is required as has been expended in the agitation procedure of the present invention.

The two mixing tools between which the aforementioned gap lies, through which the mixture intended for the formation of the binder is driven, should rotate relatively to one another. This can be accomplished simply by fixing one mixing tool and rotating the other. It is also possible, however, for both mixing tools to rotate, either in opposite turning directions or with the same turning direction but at different speeds of revolution.

It is especially preferable if the mixture containing the bitumen and thermoplastic synthetic material is driven through a gap between the mixing tools having an average width of about 0.1 ml or narrower. By processing the mixture to be homogenized through a very narrow gap, it is possible to further intensify the decomposition of the synthetic material leading to the production of the highly reactive molecular fragments that show a special tendency to recrystallize. It has been determined that it is possible to achieve this effect at lower mean temperatures of the mixture by decreasing the gap width. It is also advantageous to form the gap in such a way so that the mixture in the gap is subjected to pressure built up by hydrodynamic action.

The decomposition of the synthetic material molecules and the formation of the especially reactive fragments can be promoted by the application of high centrifugal forces on the mixture of bitumen and thermoplastic synthetic material. Toward this end, it is very favorable to impart to the mixture a velocity of revolution as high as possible and then brake the mixture from this velocity in a brief period of time. The decomposition of the synthetic material molecules due to these forces can be explained in the following manner. The synthetic material molecules, through their high molecular mass, take on a high velocity under the influence of the centrifugal forces. The energy arising during rapid braking, viewed energetically, is transformed and used to achieve a very high temperature. Fortunately, these high velocities and the energies or temperatures arising from the braking occur during only very brief periods of time, so that no disadvantageous disintegration of the thermoplastic synthetic materials arises. Moreover, the bitumen does not experience, practically speaking, any adverse effects corresponding to this brief period of high heating, this being due to the bitumen having a much lower molecular mass than the thermoplastic synthetic substance present in the mixture.

The kinetic energy of the molecules, which is derived from the mass and from the square of the velocity, is proportional to the absolute temperature of these molecules. There is produced, in the aforementioned treatment of a mixture in which molecules are present whose molecular masses differ markedly, for example by a factor of 20, with fully abrupt braking, a difference in the temperature rise that corresponds to this factor, the molecules with the lower molecular mass undergoing a lesser and the molecules with the higher molecular mass undergoing a greater temperature increase.

For this form of execution of the process of the invention, it is preferred that the mixture be driven through a gap running radially at least at the emergence edge between two coaxially rotating mixing tools. An especially good result may be achieved if the mixture is abruptly braked on a rebound surface in the gap zone, preferably immediately after its emergence from the gap, since this results in the high velocity imparted to the synthetic substance molecules by centrifugal force being transformed particularly efficiently into a state corresponding to brief high heating.

The invention is further explained with the aid of examples having supplementary references to the drawings.

EXAMPLE 1

A molten mixture which consisted of 94% wt. of bitumen B 100 and 6% wt. of high density polyethylene was first lightly agitated in a supply container. This mixture was fed from the supply container to a run-through mixing apparatus which had two plate-form mixing tools standing opposite one another in which the one mixing tool was at a standstill and the other was rotatably arranged coaxially to the first and was connected to a driving means. Both the standing mixing tool and the rotating mixing tool were provided with ribs on sides facing one another. On the facing sides of the two mixing tools there was a gap of about 0.1 mm between the ribs of the one mixing tool and the ribs of the other mixing tool through which the mixture to be treated was driven. The circumferential velocity of the rotating mixing tool at the outer edge of the gap was about 30 m/s. Likewise, the flow velocity of the mixture through the gap was about 30 m/s. The mixture was driven six times through the run-through mixing apparatus, requiring about 20 minutes. The bituminous binder thus obtained was mixed with a preheated rock material and rock meal filler with a standardized composition for asphalt concrete 0.8. Using the construction material thus obtained in standardized procedure, Marshall test bodies were produced which were thereupon examined for their mechanical properties. The measurement values obtained are presented in column 1 of the Table.

EXAMPLE 2

A procedure analogous to that of Example 1 was followed. However, the mixture for the production of the binder consisted of 94% wt. of bitumen B 100 and 6% wt. of low density polyethylene. The measurement values obtained are listed in column 2 of the Table.

EXAMPLE 3

A procedure was followed analogous to Example 1. However, the mixture for the production of the binder consisted of 94% wt. of bitumen B 100 and of 6% wt. of ethylene propylene-diene copolymerizate. The measurement values obtained are given in column 3 of the Table.

EXAMPLE 4

A procedure analogous to Example 1 was followed. However, the mixture for the production of the binder consisted of 94% wt. of bitumen B 100 and of 6% wt. of styrene-butadiene-styrene block polymerizate. The measurement values obtained are given in column 4 of the Table.

EXAMPLE 5

A procedure was followed analogous to Example 1. However, the mixture for the production of the binder consisted of 94% wt. of bitumen B 100 and 2% wt. of ethylene propylene-diene copolymerizate and 4% wt. of low density polyethylene. The measurement values obtained are given in column 5 of the Table.

EXAMPLE 6

A procedure was followed analogous to that of Example 1. However, the mixture for the production of the binder consisted of 94% wt. of bitumen B 100 and of 2% wt. of ethylene-propylene-diene copolymerizate and 4% wt. of high density polyethylene. The measurement values obtained are presented in column 6 of the Table.

EXAMPLE 7

The properties of the bitumen used in Examples 1 to 6 and those of a construction material analogously produced with it were compared. The measurement values obtained are given in column 7 of the Table.

EXAMPLE 8

The finished binder obtained according to Example 1 was subjected while in a cooled state to an X-ray spectral examination. A spectrum was obtained and is designated by the letter a in FIG. 1. Further, a visually homogeneous mixture mixed by simple agitation, which had the same composition as the mixture according to Example 1, was subjected while in a cooled state to the same x-ray spectral examination. A spectrum was obtained and is designated by the letter b in FIG. 1. The polyethylene used in FIG. 1 was also subjected while in a cooled state to this X-ray spectral examination. A spectrum was obtained and is designated by the letter c in FIG. 1. It is evident from these X-ray spectra that the strong spectral lines that are present in the spectrum designated by the letter c and which are caused by the crystalline structure of the polyethylene no longer appear in spectrum b. From this it follows that this mixture of bitumen and polyethylene which was mixed by mere agitation has virtually no crystalline structure present in the cooled state. In spectrum a there appears spectral lines which correspond to the strong spectral lines of spectrum c coming from the crystalline structure of the polyethylene. From this it is concluded that the binder produced according to Example 1 has at least a partially crystalline structure in the cooled state that has arisen from the molecule fragments of the polyethylene.

EXAMPLE 9

Figures 2A, 2B, 2C:
FIG. 2 discloses sectional views the various substances referred to in FIG. 1.

A sample of a binder was produced according to Example 2 from 94% wt. of bitumen B 100 and 6% wt. of low density polyethylene. This was allowed to harden in a beaker, after which the body thus obtained was split open vertically. The split surface showed a homogeneous appearance upon illumination with visible light. Upon illumination with ultraviolet light, a dense pattern of uniformly distributed bright points on a darker background was visible. A figure of this split surface is designated by the letter a in FIG. 2. A further sample of this binder was stored for 24 hours at 160° C. in a beaker and then left preserved in this beaker, after which the body that had thus arisen was split open. Upon illumination with ultraviolet light there was recognizable a bright layer which occupied approximately the upper third of this body in the preceding storage which the remaining two-thirds of the body lying under it had a dark color. A figure of the split surface of this body is designated by the letter b in FIG. 2. This body was then remelted and this melt was thoroughly agitated at about 170° C., the melt after a few minutes achieving a fully homogeneous appearance.

EXAMPLE 10

A mixture was formed of the substances used in Example 2 having a composition of 94% wt. of bitumen B 100 and 6% wt. of low density polyethylene. This mixture was agitated for 1½ hours at 280° C. to form a homogeneous product. A sample of this product was then stored for 24 hours at 160° C. in a beaker and then allowed to cool, after which the body that had thus formed was split open. Upon illumination with ultraviolet light a bright layer was perceptible which had in its volume approximately the volume of the polyethylene constituent of the product and which in the preceding storage was located on the upper side. An illustration of the cleavage surface of this body is designated by the letter c in FIG. 2. This body was then melted and the melt thus obtained was again thoroughly agitated at about 280° C. This agitation had to be continued for over one hour in order to achieve a fully homogeneous appearance of the melt.

TABLE

| EXAMPLE | 7 | 1 | 2 | 3 | 4 | 5 | 6 |
|---|---|---|---|---|---|---|---|
| | B 100 100% | B 100 94% HOPE 6% | B 100 94% LOPE 6% | B 100 94% EPDM 8% | B 100 94% SBS 6% | B 100 94% LOPE 4% EPDM 2% | B 100 94% HOPE 4% EPDM 2% |
| Softening point ring and ball °C. | 48.0 | 57.0 | 54.0 | 88.0 | 72.0 | 88.0 | 74.0 |
| Penetration at 25° C. 1/10 mm | 101.0 | 75.0 | 81.0 | 47.0 | 82.0 | 40.3 | 32.3 |
| Brittle point °C. | −8 | −10 | −10 | −21 | −15 | −15 | −14 |
| Binder content M % | 5.2 | 5.2 | 5.2 | 5.2 | 5.2 | 5.2 | 5.2 |
| Crude denstiy g/cm$^3$ | 2.60 | 2.60 | 2.60 | 2.80 | 2.58 | 2.58 | 2.58 |
| Volumetric density g/cm$^3$ | 2.55 | 2.54 | 2.52 | 2.53 | 2.54 | 2.59 | 2.54 |
| Void content vol % | 1.9 | 2.3 | 3.1 | 2.7 | 1.8 | 1.8 | 1.8 |
| Stability "I" KN | 11.0 | 12.4 | 15.4 | 13.8 | 18.1 | 15.3 | 14.5 |
| Flow value "F" mm | 5.07 | 4.47 | 2.93 | 4.47 | 5.00 | 4.50 | 4.57 |
| Rigidity T/F KN/mm | 2.1 | 2.7 | 5.2 | 3.1 | 2.8 | 3.4 | 3.1 |
| Crushing strength/25° C./N/mm$^2$ | 0.81 | 1.04 | 1.43 | 1.27 | 0.78 | 1.41 | 1.39 |
| Crushing strength/40° C./N/mm$^2$ | 0.18 | 0.31 | 0.48 | 0.45 | 0.28 | 0.47 | 0.48 |
| E-modulus/25° C. N/mm$^2$ | 481 | 708 | 1197 | 808 | 401 | 1104 | 1085 |
| E-modulus/40° C. N/mm$^2$ | 110 | 202 | 458 | 327 | 189 | 320 | 304 |
| Density overall g/cm$^3$ | 1.018 | 1.013 | 1.017 | 1.018 | 1.022 | 1.029 | 1.025 |

What is claimed is:

1. A process for the production of a bituminous binder comprising:
   combining molten bitumen with a thermoplastic material having a molecular weight greater than that of said bitumen to form a mixture; and
   mixing the bitumen and thermoplastic material mixture to effect homogenization by driving the mixture through a narrow gap having a width less than 3 mm using an amount of kinetic energy corresponding to the difference between about the treatment temperature of the mixture and a temperature sufficient to cause the thermoplastic material to form reactive fragments which react to form a partially crystalline structure different than that of said thermoplastic material.

2. The process of claim 1 wherein said thermoplastic material is an olefin polymer.

3. The process of claim 1 wherein said gap is in the range of about 0.3 to 3.0 mm.

4. The process of claim 1 wherein said gap is less than about 0.3 mm.

5. The process of claim 1 wherein said gap is less than about 0.1 mm.

6. The process of claim 1 wherein the mixture is subjected in the gap to a pressure built up by hydrodynamic action.

7. The process of claim 1 wherein the mixture is driven through said gap which runs radially at least at the emergence edge.

8. The process of claim 1 wherein the mixture is abruptly braked in the gap on an impact surface.

9. A bituminous binder for construction materials, prepared in accordance with the process of claim 1.

10. A bituminous binder for construction materials, prepared in accordance with the process of claim 1.

11. A bituminous binder for construction materials, prepared in accordance with the process of claim 2.

12. A bituminous binder for construction materials, prepared in accordance with the process of claim 3.

13. A bituminous binder for construction materials, prepared in accordance with the process of claim 4.

14. A bituminous binder for construction materials, prepared in accordance with the process of claim 5.

15. A bituminous binder for construction materials, prepared in accordance with the process of claim 6.

16. A bituminous binder for construction materials, prepared in accordance with the process of claim 7.

17. A bituminous binder for construction materials, prepared in accordance with the process of claim 8.

18. A process according to claim 1 wherein said gap is defined by two mixing tools arranged in facing relationship with one another, one of said mixing tools rotating relative to the other.

19. A process according to claim 18 wherein said mixing is interrupted by pauses after each pass through the gap.

20. A process according to claim 1 wherein said mixing is continued until a clear structural change in the mixture is ascertainable.

21. A process according to claim 20 wherein said clear structural change is determined by X-ray spectroscopy.

22. A process according to claim 1 wherein the mixture is abruptly braked immediately after its emergence from the gap.

23. A process according to claim 2 wherein said thermoplastic material is a polyethylene.

24. A bituminous binder for construction materials, prepared in accordance with the process of claim 18.

25. A bituminous binder for construction materials, prepared in accordance with the process of claim 19.

26. A bituminous binder for construction materials, prepared in accordance with the process of claim 20.

27. A bituminous binder for construction materials, prepared in accordance with the process of claim 21.

28. A bituminous binder for construction materials, prepared in accordance with the process of claim 22.

29. A bituminous binder for construction materials, prepared in accordance with the process of claim 23.

30. The process according to claim 8 wherein said gap is in the range of about 0.3 to 3.0 mm.

31. The process according to claim 8 wherein said gap is less than about 0.3 mm.

32. The process according to claim 8 wherein said gap is less than about 0.1 mm.

33. A bituminous binder for construction materials prepared in accordance with the process of claim 30.

34. A bituminous binder for construction materials prepared in accordance with the process of claim 31.

35. A bituminous binder for construction materials prepared in accordance with the process of claim 32.

36. A process according to claim 8 wherein said gap is defined by two mixing tools arranged in facing relationship with one another, one of said mixing tools rotating relative to the other.

37. A process according to claim 36 wherein said mixing is interrupted by pauses after each pass through the gap.

* * * * *